United States Patent
Gilibert et al.

(10) Patent No.: US 11,571,791 B2
(45) Date of Patent: Feb. 7, 2023

(54) PORTABLE ELECTRICAL TOOL EQUIPPED WITH A ROTARY TRANSFORMER PROVIDED WITH COIL HAVING PLASTO-FERRITE SUPPORT

(71) Applicant: ETABLISSEMENTS GEORGES RENAULT, Saint Herblain (FR)

(72) Inventors: Arnaud Gilibert, Saint Herblain (FR); Julien Picard, Quimper (FR); Christophe Guihard, Missillac (FR)

(73) Assignee: ETABLISSEMENTS GEORGES RENAULT, Saint Herblain (FR)

( * ) Notice: Subject to any disclaimer, the term of this patent is extended or adjusted under 35 U.S.C. 154(b) by 369 days.

(21) Appl. No.: 16/717,250

(22) Filed: Dec. 17, 2019

(65) Prior Publication Data

US 2020/0198104 A1 Jun. 25, 2020

(30) Foreign Application Priority Data

Dec. 21, 2018 (FR) ...................................... 1873880

(51) Int. Cl.
*B25B 23/147* (2006.01)
*H02K 11/24* (2016.01)
(Continued)

(52) U.S. Cl.
CPC ........ *B25B 23/147* (2013.01); *B25B 23/1475* (2013.01); *H01F 38/18* (2013.01);
(Continued)

(58) Field of Classification Search
CPC ..... B25B 23/147; B25B 21/008; B25B 23/14; B25B 23/00; B25B 23/1475; B25B 21/00;
(Continued)

(56) References Cited

U.S. PATENT DOCUMENTS 6,468,441 B1 * 10/2002 Kobayashi .......... C04B 35/2658
252/62.62
2009/0114204 A1 * 5/2009 Ohnishi ................... B28D 1/24
83/956
(Continued)

FOREIGN PATENT DOCUMENTS

CN 107026550 A * 8/2017
CN 207910558 U * 9/2018
(Continued)

OTHER PUBLICATIONS

Erwin Peng, "Ferrite-based soft and hard magnetic structures by extrusion free-forming", 2017. Royal Society of Chemistry, 10.1039/C7RA03251J (Year: 2017).*
(Continued)

*Primary Examiner* — Bickey Dhakal

(74) *Attorney, Agent, or Firm* — David D. Brush; Westman, Champlin & Koehler, P.A.

(57) ABSTRACT

An electromechanical tool including a casing, a shaft driving a tip in rotation and a rotary transformer. The rotating shaft integrates an electronic circuit configured to measure a physical parameter of the shaft, and the rotary transformer includes a stator fixedly attached to the casing and a rotor affixed to the rotating shaft. The stator integrates a first coil and a first support of this first coil, and the rotor integrates a second coil and a second support of this second coil. The supports are made out of plasto-ferrite material.

11 Claims, 3 Drawing Sheets

(51) Int. Cl.
  *H01F 38/18* (2006.01)
  *H02K 7/14* (2006.01)
  *G11B 5/706* (2006.01)
  *H01F 1/11* (2006.01)
  *H02K 7/00* (2006.01)

(52) U.S. Cl.
  CPC ............ *H02K 7/145* (2013.01); *H02K 11/24* (2016.01); *G11B 5/70678* (2013.01); *H01F 1/11* (2013.01); *H02K 7/003* (2013.01)

(58) Field of Classification Search
  CPC ....... B25B 19/00; B25B 21/004; B25B 21/02; B25B 23/1405; H01F 38/18; H01F 1/11; H02K 7/145; H02K 11/24; H02K 7/003; G11B 5/70678
  See application file for complete search history.

(56) References Cited

U.S. PATENT DOCUMENTS

| | | | |
|---|---|---|---|
| 2009/0121590 A1* | 5/2009 | Fukano | H02K 11/21 310/75 B |
| 2010/0197205 A1* | 8/2010 | Ohnishi | B24B 1/04 451/67 |
| 2010/0269646 A1 | 10/2010 | Le Du et al. | |
| 2020/0195104 A1* | 6/2020 | Bulatow | H01F 38/18 |

FOREIGN PATENT DOCUMENTS

| | | | | |
|---|---|---|---|---|
| DE | 1920890 A1 | 11/1970 | | |
| DE | 4210201 A1 | 9/1993 | | |
| DE | 4214376 A1 * | 11/1993 | ............... | H01F 1/37 |
| DE | 4307131 A1 | 9/1994 | | |
| DE | 19637934 A1 | 3/1998 | | |
| EP | 0159825 A2 | 10/1985 | | |
| EP | 0712105 A2 | 5/1996 | | |
| EP | 3043458 A1 | 7/2016 | | |
| EP | 3287237 A1 * | 2/2018 | ............ | B23P 19/066 |
| FR | 2839825 A1 | 11/2003 | | |
| JP | S614676 A | 1/1986 | | |
| JP | 2008160973 A * | 7/2008 | ......... | G11B 7/00455 |
| JP | 2010184329 A | 8/2010 | | |
| WO | 2007063106 A1 | 6/2007 | | |
| WO | 2010144048 A1 | 12/2010 | | |

OTHER PUBLICATIONS

English translation of the French Written Opinion dated Oct. 8, 2019 for corresponding French Application No. FR1873880, filed Dec. 21, 2018.

French Search Report and Written Opinion dated Oct. 8, 2019 for corresponding French Application No. FR1873880, filed Dec. 21, 2018.

* cited by examiner

[Fig 1]
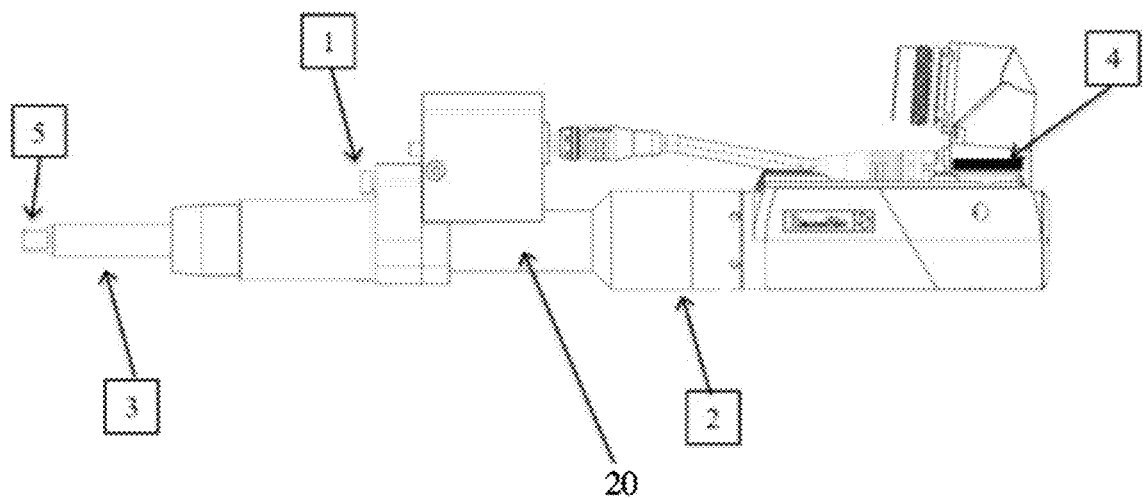
[Fig 2]
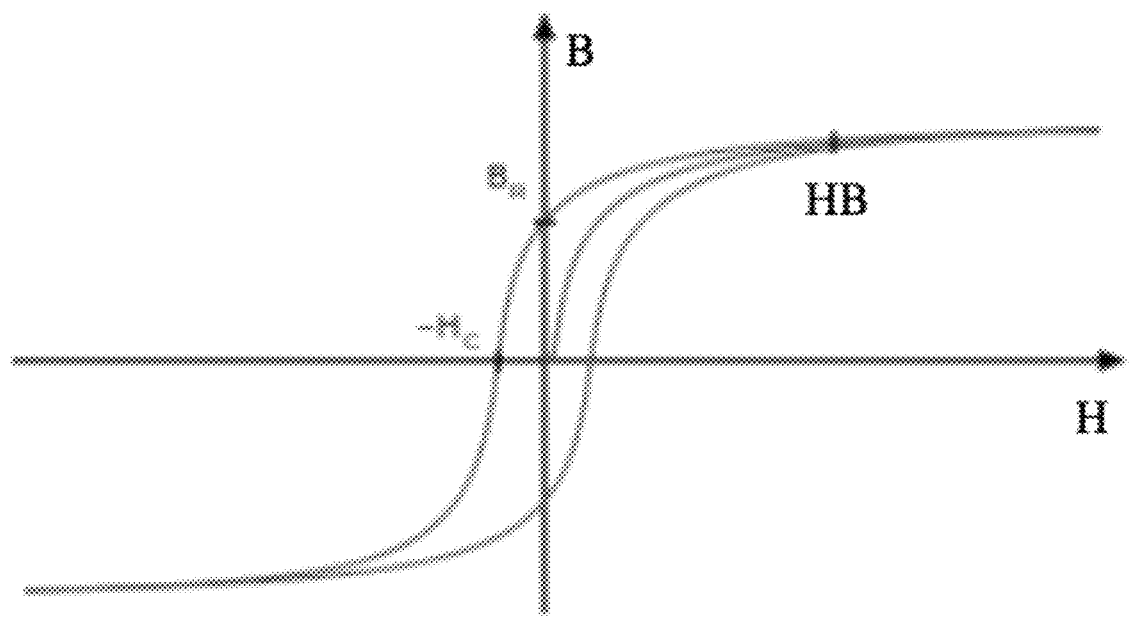

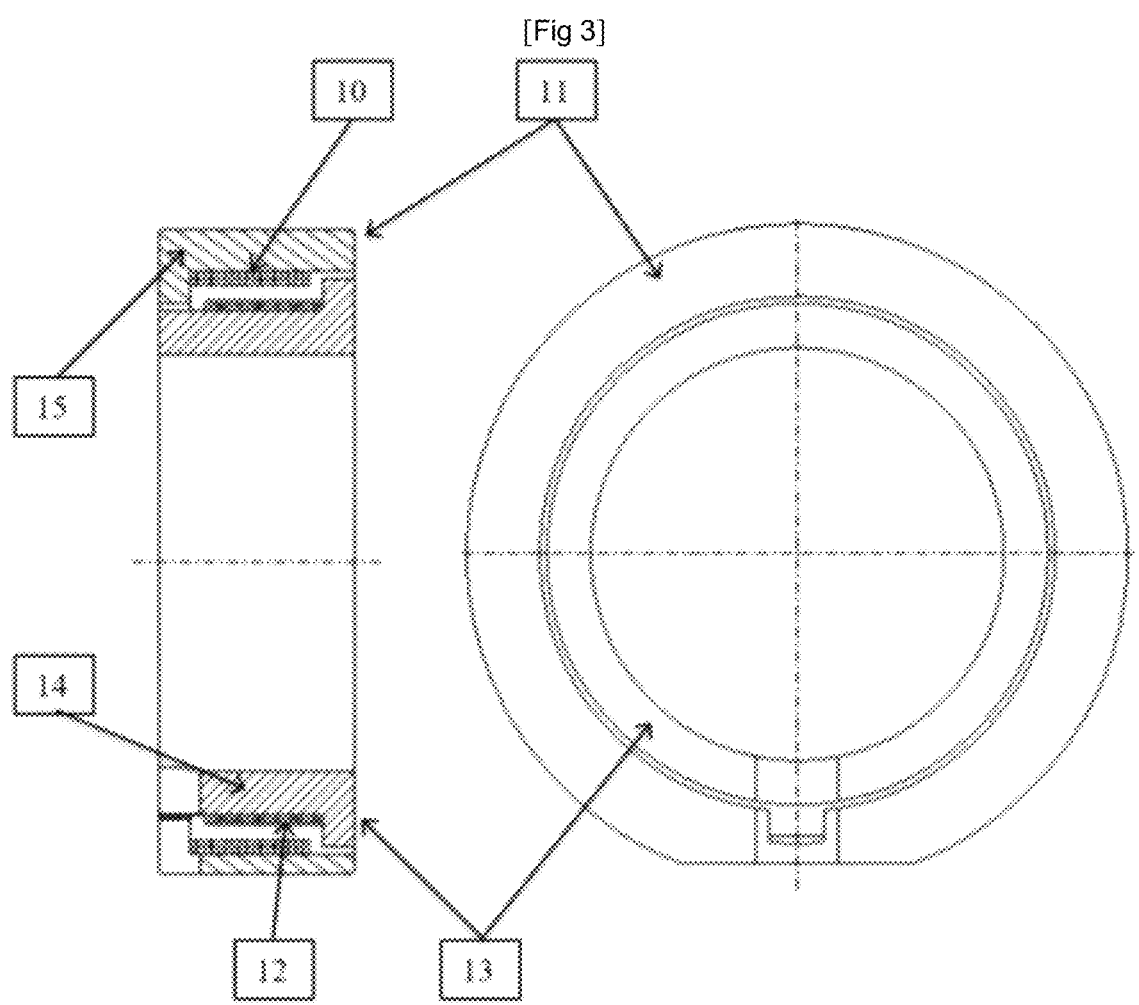

[Fig 4]
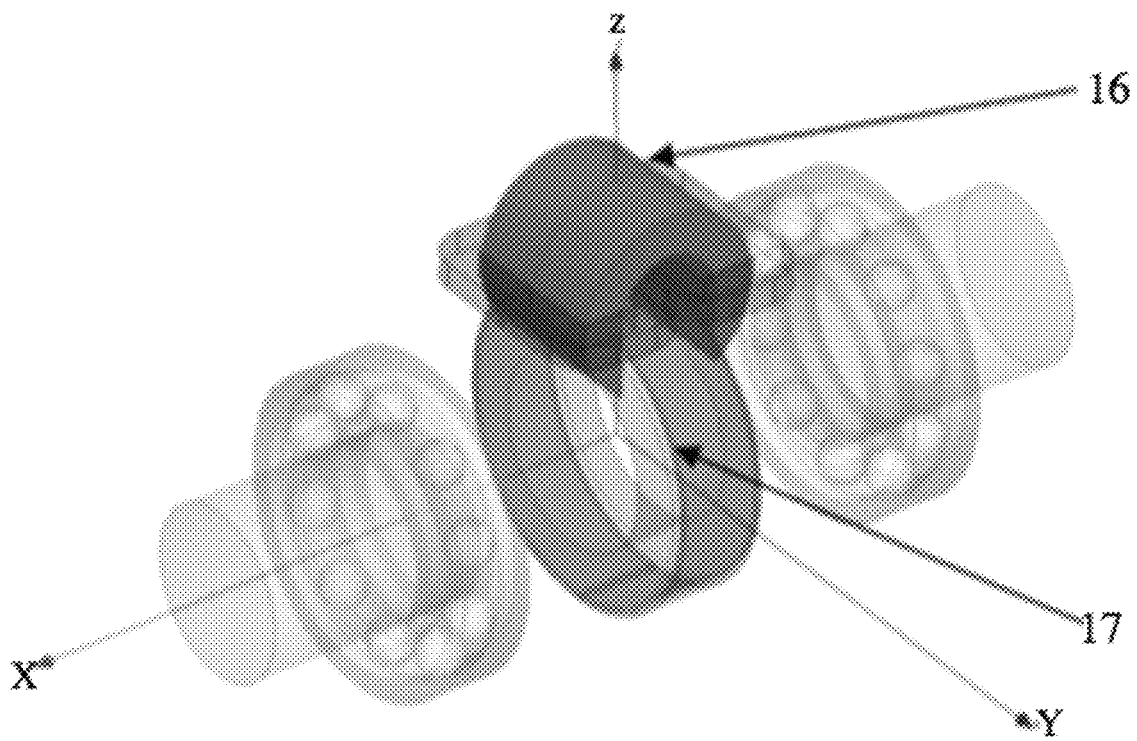
[Fig 5]
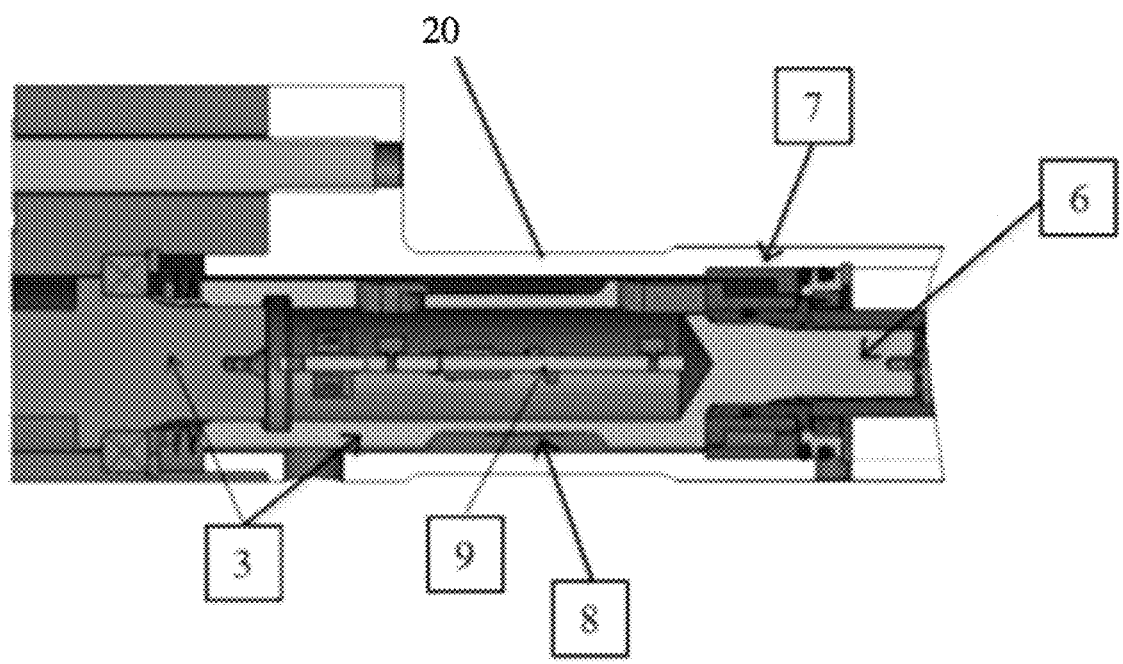

PORTABLE ELECTRICAL TOOL EQUIPPED WITH A ROTARY TRANSFORMER PROVIDED WITH COIL HAVING PLASTO-FERRITE SUPPORT

1. FIELD OF THE DISCLOSURE

The field of the disclosure is that of the designing and manufacturing of electromechanical tools, used in industry, that could be screwdrivers, drills or torque measuring devices. More specifically, the disclosure concerns a rotary transformer embedded in the rotor of an electromechanical tool and designed to generate electrical voltage intended for powering an electronic board placed in the rotor. The supports of the coils contained in the rotary transformer according to the disclosure are made out of plasto-ferrite in order to give them increased impact strength.

2. TECHNOLOGICAL BACKGROUND

There are many electromechanical tools used in industry, in automobile production assembly lines for example. These tools are for example: screwdrivers, impact wrenches or impulse wrenches, drills, torque measurement devices and generally any tool provided with a shaft driven in rotation and extended at one extremity with a terminal element, a screwdriver tip for example. This type of tool is subjected to severe conditions of use: high productivity demands, impacts caused by handling with little precaution, docking with poor shock absorption in the context of automatic machines or again vibrations proper to discontinuous tightening screwdrivers.

These tools can have a torque-measurement means applied to the rotating output shaft. It turns out that the measurement of the torque in these electromechanical tools gives better results if it is applied as closely as possible to the terminal element and therefore to the output shaft of the screwdriver. Torque sensors known as dynamic torque sensors have been developed for this purpose.

In this type of structure, the strain gauges are bonded to the rotating shaft in the form of a Wheatstone bridge and it is not possible to power them and recover their signal with simple wires forming an electrical junction between the rotating shaft and the electronic board of the tool. To respond to this difficulty, solutions using a rotary transformer have been developed to set up the electrical connection between the tool casing and the shaft. A rotary transformer offers high lasting quality, which is not the case with an electrical collector, the brushes of which are subjected to wear and tear. The screwdrivers generally integrate a measurement of torque on the shaft.

A rotary tool using mechanical contactless inductive means to ensure the power supply and communications with the torque measurement means embedded in the shaft comprises especially the following elements:
 a casing forming the external envelope of the tools,
 a main electronic board supporting the screwdriver control means,
 interface elements providing for the mechanical support of the screwdriver when it is in operation and enabling its activation and the display of its status,
 motor means which possibly integrate a synchronous electrical motor with a permanent magnet rotationally driving an output shaft,
 torque measurement means integrating:
  an electronic board embedded in the output shaft,
  a strain gauge bridge bonded to the output shaft
  a rotary transformer comprising a stator fixed relative to the casing and a rotor fixed relative to the shaft and situated so as to be facing the stator, the stator being connected to the main electronic board and the rotor being connected to the embedded board.

The transformer provides for power supply by induction for the board embedded on the rotating shaft. This rotary transformer typically comprises two rings, one for the stator and the other for the rotor, these rings being made out of ferrite. The ferrite powders are composed of iron oxide (with manganese, nickel). The magnetic properties of the ferrite powders are obtained by heat processing. This mode of obtaining is similar to that of the manufacture of ferrite where the ferrite powder provided with its binder is compacted before passage through an oven.

The function of the embedded electronic board is to recover a supply voltage coming from the rotor and transmit it to the gauges after rectification and then to recover the output voltage from the gauges, condition this voltage and transmit it to the rotor. A main electronic board is carried by the casing and works in a complementary manner with the board embedded on the output shaft.

The patent EP0712105 "Electrical power and signal transmission system", filed on Nov. 14, 1994 describes such a solution. This type of structure uses a rotary transformer, the rings of which are made of ferrite to provide for proper circulation of the magnetic field. These components are formed by two coils disposed on a support capable of channeling the magnetic flux. The support is made of ferrite and implemented by sintering. This material gives special performance features to the rotary transformer characterized by its magnetic permeability. The surfaces of the rings facing each other are sized to enable the transmission of the magnetic flux from one ring to the other through the air gap.

Other documents of the prior art partly or totally describe this type of device, and are cited here below by way of technological background documents:
 the document DE 1920890 filed on Apr. 3, 1980 illustrates an example of a rotary transformer;
 the document EP0159825 filed on Jun. 15, 1984 illustrates a torque sensor using rotary transformers;
 the document JPS614676 filed on Mar. 28, 1992 illustrates a pneumatic screwdriver provided with a strain-gauge torque sensor on the output shaft, the power supply of the strain gauges being provided by a first rotary transformer and the recovery of the signal by a second rotary transformer;
 the document DE4210201 filed on Mar. 28, 1992 illustrates a pneumatic screwdriver provided with a strain-gauge torque sensor on the output shaft, the power supply and the recovery of the signal from the strain gauges being obtained by a rotary transformer. Signal-processing electronic circuitry is embedded in the rotating shaft to prepare the signal before it is sent to the control means of the tool by the same rotary transformer;
 the document DE4307131 filed on Mar. 6, 1993 illustrates a measurement of torque on a screwdriver output shaft, the supply and the recovery of the signal from the strain gauges being done by a rotary transformer;
 the document DE19637934 filed on Sep. 1, 1996 illustrates means for measuring torque on the output shaft of an angle screwdriver. A rotary transformer is used to power the strain gauges on the rotating shaft. The signal produced by these strain gauges is sent on to the tool control means by optical means;

the document JP2010184329 filed on Feb. 13, 2009 illustrates a screwdriver using rotary transformers, the geometry of which improves its reliability;

the document WO2007063106 filed on May 1, 2005 illustrates an angle screwdriver comprising means for measuring torque on its output shaft. A rotary transformer is used to power and recover the signal of a strain gauge bridge bonded to the shaft;

the document WO2010144048 filed on Jun. 11, 2009 illustrates a screwdriver comprising means for measuring torque on a rotating shaft. A rotary transformer is used to power and recover the signal of a gauge bridge bonded to the shaft. The ferrite elements are brittle and risk getting split and breaking under impact, for example when the tool is dropped on the ground. Repairing such a tool is a painstaking process because it requires complete dismantling of the rotating shaft.

Making a rotary transformer by sintering ferrite powder dictates a method of sintering specific to each geometry and does not allow the use of a standard machining method.

3. SUMMARY

To this end, an exemplary embodiment of the disclosure proposes an electromechanical tool comprising a casing, a shaft driving a tip in rotation and a rotary transformer. The rotating shaft incorporates an electronic circuit intended to measure a physical parameter of the shaft and the rotary transformer comprises a stator fixedly attached to the casing and a rotor affixed to the rotating shaft. The stator integrates a first coil and a first support of this first coil, the rotor integrates a second coil and a second support of this second coil. The supports are made out of plasto-ferrite material.

In this way, the tool thus made is more solid and is more resistant to impacts, especially to falls According to a first embodiment, the physical parameter measured is a torque or a force. In this way, the tool is informed about the torque or the force that is applied to the moving parts, more particularly the torque applied to a screw or the tensile strength that is established in a screw following a screwing operation.

According to another embodiment, the plasto-ferrite material is constituted by different metals reduced to powder and a plastic matrix binding the metal grains.

According to another embodiment, the matrix is chosen from the list of the following materials: polyamide, polyacetal. phenylene polysulfide.

According to another embodiment, the concentration in ferrite ranges from 80% to 95% of the total mass of the plasto-ferrite material.

According to another embodiment, the diameter of the wires surrounding said coil ranges from 0.25 to 0.35 millimeters.

According to another embodiment, the ferrite powder is a magnetic.

According to another embodiment, the ferrite powder is chosen from a list of powders comprising: (an alloy of iron, nickel, zinc, aluminium and silicon), (alloy of iron and sodium).

According to another embodiment, the magnetic permeability of the plasto-ferrite ranges from 5 to 30.

According to another embodiment, the ratio of the number of turns of the stator to that of the rotor ranges from 0.2 to 0.5.

4. DESCRIPTION OF THE FIGURES

Other features and advantages of the disclosure shall appear from the following description of particular embodiments, given by way of a simple illustratory and non-exhaustive examples and from the appended drawings, of which:

FIG. 1 illustrates a diagram of an electronic tool implementing an exemplary embodiment of the disclosure;

FIG. 2 illustrates a hysteresis curve representing the relationship between the field force H and the magnetization B;

FIG. 3 represents the section of a rotary transformer seen in a front view and side view according to one embodiment;

FIG. 4 shows a view in perspective or three-quarter view of the coupling between the rotor and the stator according to another embodiment of a rotary transformer;

FIG. 5 shows a view in section of a tool showing the rotor and the stator of a rotary transformer according to one example of an embodiment.

5. DESCRIPTION OF PARTICULAR EMBODIMENTS

Referring to FIGS. 1, 3 to 6, we present a portable electrical tool, a screwdriver for example, provided with a torque sensor embedded in the rotating shaft. An exemplary embodiment of the disclosure relies on the use of a material called plasto-ferrite combining a plastic or resin matrix charged with ferrite powder.

FIG. 1 presents an example of an electromechanical tool according to one exemplary embodiment of the disclosure. According to this example, the tool is a screwing device or screwdriver 1. As is shown in FIG. 1, such a screwdriver comprises a casing 2 that houses motor means within it. In this embodiment, these motor means comprise an electrical motor. The screwdriver comprises an output shaft 3 that has a first extremity 5 that extends out of the casing 2. This first extremity is meant to cooperate with a terminal element that is for example a screwdriver tip or a sleeve meant to cooperate with an element to be screwed. The output shaft 3 has a second extremity 6 that is directly linked to the shaft of the motor or to a reduction gear means, the latter being connected to the shaft of the motor.

The screwdriver comprises a control means in the form of a main electronic board 4 through which the screwdriver is managed.

According to one variant of an embodiment, the transmission and especially the reduction gear can be such that the output shaft 3 extends perpendicularly to the axis of the motor means.

This screwdriver integrates a main electronic board that supports the control means of the screwdriver. This main electronic board receives especially signals coming from a torque sensor to determine the tightening torque from the measurement of the deformations of the output shaft 3 by means of the strain gauges. The part 20 of the tool is represented in FIG. 5.

This screwdriver, which is shown in its entirety by FIG. 1, also integrates a torque sensor. This sensor takes the form of a module crossed by the output shaft of the screwdriver. It integrates:

a rotary transformer 7, a shaft to which a strain gauge bridge 8 is bonded, an electronic board embedded in the coaxial bore of the shaft 3.

The rotary transformer gives the embedded electronic board a voltage produced by the main board of the screwdriver which, once rectified by the embedded board, powers the strain gauge bridge. This strain gauge bridge produces an output signal in the form of a voltage that is converted into a digital signal by the embedded circuit and then recovered by the rotary transformer and sent on to the main electronic board. The frequency of the alternating voltage signal powering the coil 9 which sends out the electromagnetic field typically ranges from 100 KHz to 200 KHz. The communications are made typically at a bit rate of 1 Mbit to 2 Mbits per second.

An exemplary embodiment of the present disclosure relies on the use of a material known as plasto-ferrite which combines a plastic or resin matrix charged with ferrite powder to make the rings of the rotary transformer. Here are two examples of materials proposed for making the rings constituting the rotary transformer:
- a first material comprising a matrix made of polyamide and having as a metal: iron, nickel or zinc as well as aluminium and silicon in lesser proportions;
- a second material comprising a polyacetal matrix (abbreviated as P.O.M. or Polyoxymethylene) and having, as a metal, iron and sodium in small proportions.

As an alternative to polyamide or polyacetal, the matrix can also be constituted by phenylene polysulphide.

It can be noted that these plasto-ferrites have a far lower ferrite concentration than a conventional sintered component, the proportion in ferrite of which is greater than 95% for permeability of: $\mu>10$. Experiments have shown that the efficiency of the energy transformation is optimal for a ferrite concentration of 80% to 95% of the total mass of the plasto-ferrite material. This value of magnetic permeability is given without reference to any unit. In fact, it is the multiplication of this value by the magnetic permeability of a vacuum $\mu 0$ (which itself is given in Henries per meter [H/m]). The result gives the magnetic permeability of the materials.

For a proportion of 82%, we obtain an electromagnetic permeability of $\mu=8$, and, for a proportion of 89%, we obtain: $\mu=14$.

The low ferrite content greatly impairs the magnetic permeability (with $\mu$ varying from 5 to 30). This deficiency is compensated for by a specific coil described further below in the description. Besides, it is sought to have low remanence for the transformer so as to maximize the efficiency of the transformer. For this reason, it is necessary to minimize another parameter, namely the coercive field, which should range from 50 to 1000 A/m.

In this way, the transformer, crossed by a magnetic field (necessary for the principle of transmission from the primary to the secondary), keeps its magnetic property unchanged.

The hysteresis effect as shown in FIG. 2 illustrates this principle. In this figure, the x axis indicates the force of the magnetic field H and the y axis indicates the degree of magnetization B. This figure clearly shows that the relationship between the force of the field (H) and the magnetization (B) is not linear. Thus, if the material is demagnetized (H=B=0), then the initial magnetization curve increase rapidly at the beginning and then becomes asymptotic in attaining the magnetic saturation point (Hs). If, thereafter, the magnetic field is reduced monotonically, then B follows a different curve, whence the phenomenon of hysteresis. When the field becomes zero, the magnetization is shifted from its original value by a value equal to the remanence. When there is no magnetic field, there is no magnetization either (at the point of origin) and the curves coincide with each other from the very beginning.

FIG. 3 represents the section of a rotary transformer seen in a front view and seen in a side view according to one example of an embodiment.

The rotary transformer comprises a coil 10 inside the stator 11, and a second coil 12 about the rotor 13. As shown in these two figures, the rotary transformer comprises especially two cores that can have numerous shapes and can be placed so as to be facing each other (in the example illustrated by these two figures herein, these cores are two concentric rings). These two cores are each provided with a coil. Each coil, either primary or secondary, generates or collects a magnetic field channeled by the plasto-ferrite cores.

The view in section shown in FIG. 3 makes it possible to visualize the geometry of the magnetic cores and the disposition of the windings coils 10 and 12 facing each other. Each coil is formed by enameled wires having a specific section a specific number of turns of wires.

These representations show the two magnetic cores 14 and 15 serving as supports for the coils, these cores forming two rings one internal and the other external. The set of characteristics of the two coils 10 and 12 and the two cores 14 and 15 made of plasto-ferrite define the intrinsic properties of the rotary transformer in its capacity to transmit the desired magnetic flux.

The sizing of the rings is computed by the theory of magnetism and simulation. With plasto-ferrite, unlike a better-performing material made of pure ferrite, the density of the flux generated is low because of the low coupling ratio.

The inductance, by its value, affects the capacity to transmit the power signal and a high-frequency transmission signal with a same coil.

The first step of the sizing of the rotary transformer consists of a digital simulation in order to compute:
- the induced magnetic fluxes,
- the coupling ratio between the stator and the rotor in both senses which must be the maximum and the closest to one,
- the inductance of the stator must range preferably from 5 to 20 pH depending on the size of the transformer,
- the inductance of the rotor must range preferably from 40 and 200 pH depending on the size of the transformer.

The width of the ranges is chosen so as to comply with the dual use of the transformer: power supply to the electronic board embedded in the output shaft at a frequency of 100 KHz to 200 KHz and a transmission of the (conditioned) high-frequency signal from the digitized strain gauge bridge.

The inductance is dependent on the properties of the core (magnetic permeability, the geometry of the core, the value of the air gap and the characteristics of the coil (number of turns and section of the wire).

The second step consists in prototyping and testing because the simulation does not enable the easy assessment of the losses related to the environment of the transformer (shaft and casing made of steel, a permeable cover) which degrade the coupling ratios.

To compensate for the low coupling ratio resulting from low ferrite density, the currents need to be increased without excessively amplifying the joule losses. To this end, the size of the coil is increased within the limit of the overall space available and the criterion of minimal inductance.

Finally, the minimal inductance is a constraint enforcing a minimum number of turns.

All these criteria constitute system-dependent parameters.

To enable the function of the rotary transformer with this particular material, experiments have led to the designing of a coil that minimizes Joule losses and increases the coupling ratio. The criterion of optimization meant reducing losses by increasing the section of the wires of the coils within the limit of the reduction of the number of turns.

To compensate for the low value of p, the diameter of the wires, initially 0.11 to 0.15 millimeters, is increased up to a value of 0.25 to 0.35 millimeters.

The other means of optimization is to resort to "tapping" which makes it possible to obtain a specialized coil as a function of the mode of use, power supply or data transmission.

Tapping consists in providing electrical connections between the two extremities of the coils enabling a double coil configuration on the rotor and the stator used according to the functional mode (power supply or high-frequency communications). This tapping makes it possible, in power generation mode for the power supply to the secondary circuit, to configure a maximum number of turns. This tapping also makes it possible, in high-frequency communications mode, to increase the capacity of the communications by reducing the number of turns.

FIG. 4 shows a view in perspective or three-quarter view of the coupling between the rotor and the stator according to another embodiment of a rotary transformer.

In order to respond to a constraint of compactness of the product, a particular transformer architecture is provided. The rotor part 17 remains unchanged with the principle of an O-ring provided with a coil made by a traditional wire coil. The stator part 16 on the contrary takes a "C" shape, where the aperture of the C enables the passage of the rotor part 17. The core of the stator part occupies a prismatic volume that enables the location of the shape in a portion generated by revolution about the axis of the tool. The compactness of the solution is degraded locally on a sector but provides a maximum compactness for the solution outside the sector.

With an architecture of this kind, the coupling on a limited sector affects the density of the magnetic flux.

FIG. 5 shows a view in section of the part referenced 20 of the tool presented in FIG. 1, showing the rotor and the stator of a rotary transformer according to one example of an embodiment. The output shaft 3 supports an electronic board 12 also driven in rotation. This board is connected to torque-measuring strain gauges.

An exemplary embodiment of the present application provides an efficient solution to at least some of the different problems of the prior art.

In particular, an exemplary embodiment of the present application provides a solution in order to reinforce the impact strength of the element making it possible to measure the torque applied to the rotating shaft of an electromechanical tool.

An exemplary embodiment of the present application sets up a technique for making a transformer that uses standard means that are reliable and robust but are also simple in design. This technique also reduces the costs of production of the transformer.

Although described through a certain number of detailed exemplary embodiments, the proposed devices comprises different variants, modifications and improvements that will appear in an obvious manner to those skilled in the art, it being understood that these different variants, modifications and improvements are within the scope of the invention as defined by the following claims. In addition, different aspects and characteristics described here above can be implemented together or separately or else substituted for one another and all the different combinations and sub-combinations of the aspects and characteristics form part of the scope of the invention. In addition, it can happen that certain devices described here above do not incorporate all the modules and functions planned for the embodiments described.

The invention claimed is:

1. An electromechanical tool comprising:
    a casing,
    a rotatable shaft to drive a tip in rotation; and
    a rotary transformer, said shaft integrating an electronic circuit configured to measure a physical parameter of the shaft, said rotary transformer comprising a stator fixedly attached to the casing and a rotor affixed to the rotatable shaft, the stator integrating a first coil and a first support of said first coil, the rotor integrating a second coil and a second support of said second coil, wherein said first and second supports are made out of plasto-ferrite material.

2. The electromechanical tool according to claim 1, wherein the physical parameter measured is a torque or a force.

3. The electromechanical tool according to claim 1, wherein the plasto-ferrite material is constituted by different metals reduced to powder having metal grains and a plastic matrix binding the metal grains.

4. The electromechanical tool according to claim 3, wherein the matrix is chosen from the list of the following materials: polyamide, polyacetal, phenylene polysulfide.

5. The electromechanical tool according to claim 3, wherein a concentration in ferrite ranges from 80% to 95% of the total mass of the plasto-ferrite material.

6. The electromechanical tool according to claim 3, wherein the ferrite powder is amagnetic.

7. The electromechanical tool according to claim 3, wherein the ferrite powder is chosen from a list of powders comprising: an alloy of iron, nickel, zinc, aluminium and silicon; and an alloy of iron and sodium.

8. The electromechanical tool according to claim 1, wherein a diameter of wires surrounding said first and second coils ranges from 0.25 to 0.35 millimeters.

9. The electromechanical tool according to claim 1, wherein a magnetic permeability of the plasto-ferrite ranges from 5 to 30.

10. The electromechanical tool according to claim 1, wherein a ratio of a number of turns of the first coil of the stator to a number of turns of the second coil of the rotor ranges from 0.2 to 0.5.

11. The electromechanical tool according to claim 1, wherein the tool is selected from the group consisting of a screwdriver, a drill or a torque-measuring device.

\* \* \* \* \*